No. 640,257. Patented Jan. 2, 1900.
A. J. BAER.
HOOF CUTTER.
(Application filed Mar. 16, 1899.)
(No Model.)

WITNESSES
Frank S. Howell
Hartwell P. Heath

INVENTOR
Albert J. Baer,
by D. A. Gowrick,
Attorney.

THE NORRIS PETERS CO., PHOTO-LITHO., WASHINGTON, D. C.

UNITED STATES PATENT OFFICE.

ALBERT J. BAER, OF SHOENERSVILLE, PENNSYLVANIA.

HOOF-CUTTER.

SPECIFICATION forming part of Letters Patent No. 640,257, dated January 2, 1900.

Application filed March 16, 1899. Serial No. 709,316. (No model.)

*To all whom it may concern:*

Be it known that I, ALBERT J. BAER, a citizen of the United States, residing at Shoenersville, in the county of Lehigh and State of Pennsylvania, have invented certain new and useful Improvements in Animal-Shears, of which the following is a specification.

My invention relates to animal-shears, and particularly to cutters for horses' hoofs, and has for its object to provide an instrument simple and cheap in construction, but of great strength and durability, and having great leverage. This object I accomplish in the manner and by the means hereinafter more fully described in detail, and particularly pointed out in the claims, reference being had to the accompanying drawings, in which like reference-letters indicate like parts in all the figures.

Figure 1:
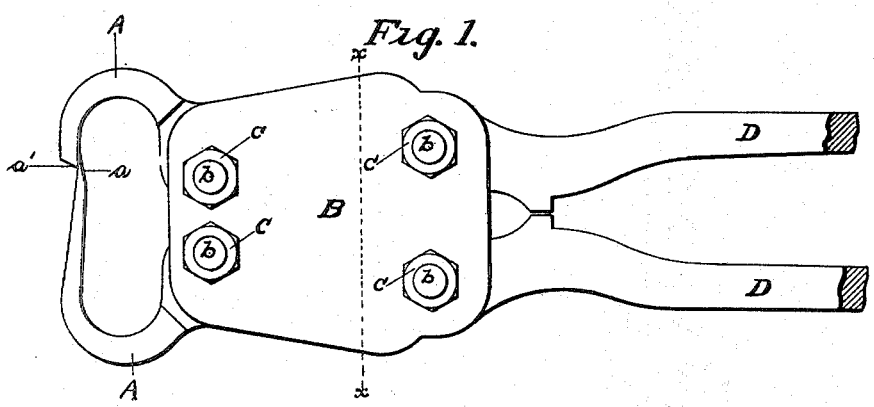
Figure 2:
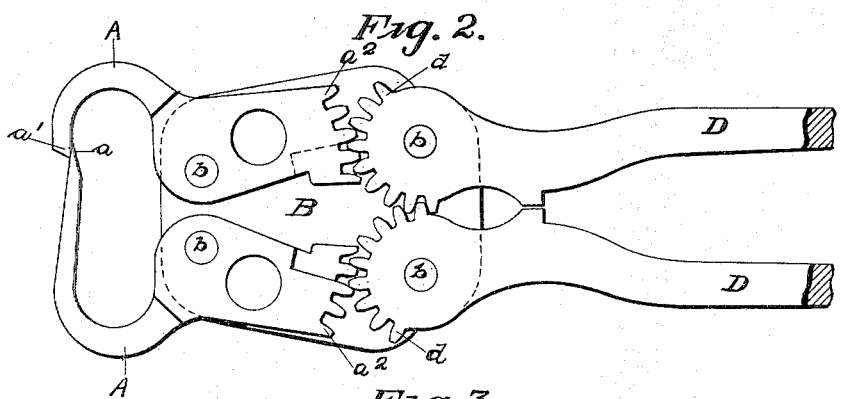
Figure 3:
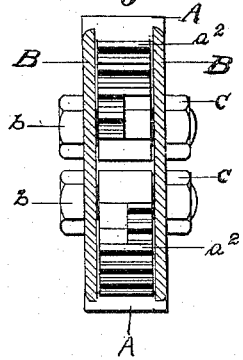

Figure 1 is a plan view of my invention. Fig. 2 is a plan view of my invention with capplate removed. Fig. 3 is a sectional view on line $x$ $x$, Fig. 1.

My invention consists of two blades A, curved toward each other and having their edges at right angles to their shanks, one a sharp edge $a$ and the other a straight edge $a'$, which when the clippers are closed overlaps the sharp edge $a$. The shanks of the blades A are secured between the plates B by bolts $b$, which pass first through the lower plate B, then through the shanks of the blades A, and are then screwed through the upper plate B. Nuts C on the ends of the bolts $b$ lock them in place. The ends of the shanks of the blades A are toothed racks $a^2$, cut away where the ends of the shanks of the blades A meet, so as to overlap one another. Handles D, provided at their ends with toothed segments $d$, which mesh with the toothed racks $a^2$, are similarly secured between said plates B by similar bolts $b$ and nuts C. This construction affords very great leverage and enables one with but little exertion to trim the hardest hoof.

The handles D being pulled apart, the toothed segments $d$, meshing with the toothed racks $a^2$, throw the blades A apart, and having grasped the part of the hoof to be removed between the edges $a$ and $a'$ the handles D are brought together, and by means of the toothed segments $d$ and toothed racks $a^2$ great force is applied at the edges $a$ and $a'$.

Having thus described my invention, what I claim as new, and desire to secure by Letters Patent, is—

1. In a horse's hoof-cutter, two blades, one having a sharp edge and the other having a blunt edge adapted to overlap the sharp edge, said blades provided at their shank ends with toothed racks, said ends being complementarily cut away to permit overlapping, and handles having toothed segments on their ends, said toothed segments meshing with said toothed racks substantially as shown and described.

2. A horse's hoof-cutter consisting of two blades curved toward each other and having their edges at right angles to their shanks, one edge being sharp and the other blunt and adapted to overlap the sharp edge, said shanks pivotally secured between two plates and provided at their ends with toothed racks, said ends being complementarily cut away to permit overlapping, and handles pivotally secured between said plates and provided at their ends with toothed segments adapted to mesh with said toothed racks, substantially as shown and described.

3. The combination of two blades curved toward each other and having their edges at right angles to their shanks, one of the edges being sharp and the other blunt and adapted to overlap the sharp one, said shanks provided at their ends with toothed racks, said ends being complementarily cut away to permit overlapping, and handles provided at their ends with toothed segments adapted to mesh with said racks, substantially as shown and described.

In testimony whereof I hereto affix my signature in the presence of two witnesses.

ALBERT J. BAER.

Witnesses:
 GUY R. JONES,
 WALTER L. JONES.